(12) United States Patent
Bigari et al.

(10) Patent No.: US 9,195,861 B2
(45) Date of Patent: Nov. 24, 2015

(54) METHODS AND SYSTEMS INVOLVING MANUFACTURING SHEET PRODUCTS BY TESTING PERFORATIONS

(71) Applicant: Georgia-Pacific Consumer Products LP, Atlanta, GA (US)

(72) Inventors: Richard J. Bigari, Suamico, WI (US); Bryan A. Brzezinski, De Pere, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 483 days.

(21) Appl. No.: 13/662,894

(22) Filed: Oct. 29, 2012

(65) Prior Publication Data

US 2013/0120555 A1 May 16, 2013

Related U.S. Application Data

(60) Provisional application No. 61/560,458, filed on Nov. 16, 2011.

(51) Int. Cl.
*G06K 5/04* (2006.01)
*B26D 5/34* (2006.01)
*B26F 1/00* (2006.01)
*B26F 1/20* (2006.01)

(52) U.S. Cl.
CPC .. *G06K 5/04* (2013.01); *B26D 5/34* (2013.01); *B26F 1/00* (2013.01); *B26F 1/20* (2013.01)

(58) Field of Classification Search
CPC .............. G06K 5/04; B26D 5/34; B26F 1/00; B26F 1/20
See application file for complete search history.

(56) References Cited

U.S. PATENT DOCUMENTS

| | | | |
|---|---|---|---|
| 6,515,295 B1* | 2/2003 | Sato et al. | 250/559.36 |
| 6,606,421 B1* | 8/2003 | Shaked et al. | 382/275 |
| 7,006,708 B1* | 2/2006 | Nako et al. | 382/294 |
| 7,799,168 B2 | 9/2010 | Zoller et al. | |
| 2003/0115836 A1* | 6/2003 | Suzuki et al. | 53/435 |
| 2003/0226431 A1 | 12/2003 | Motard | |
| 2005/0156078 A1* | 7/2005 | Ragard et al. | 242/534 |
| 2007/0268455 A1* | 11/2007 | Roser | 351/223 |
| 2009/0255387 A1* | 10/2009 | Pelletier | 83/13 |
| 2009/0320660 A1* | 12/2009 | Gwosdz-Kaupmann et al. | 83/40 |
| 2010/0072936 A1* | 3/2010 | St.Ours et al. | 318/625 |

(Continued)

FOREIGN PATENT DOCUMENTS

| | | |
|---|---|---|
| CH | 703139 A1 | 11/2011 |
| EP | 2386389 A1 | 11/2011 |
| FR | 78823 E | 9/1962 |

OTHER PUBLICATIONS

International Search Report and Written Opinion of the International Searching Authority mailed Feb. 11, 2013 in International Application No. PCT/US2012/062508.

(Continued)

*Primary Examiner* — Jay Patel
*Assistant Examiner* — Joseph Suh
(74) *Attorney, Agent, or Firm* — Laura L. Bozek

(57) ABSTRACT

A method includes receiving a first image of a first line of perforations in a sheet product, processing the first image to determine whether the first line of perforations are within specifications, and outputting an indication to an operator indicative that the first line of perforations are not within specifications responsive to determining that the first line of perforations are not within specifications.

19 Claims, 8 Drawing Sheets

(56) References Cited

U.S. PATENT DOCUMENTS

2010/0163194 A1    7/2010  Sauter et al.
2010/0164130 A1*   7/2010  Nara et al. .................. 264/37.1
2010/0330304 A1*  12/2010  Geuens et al. ................ 428/29

OTHER PUBLICATIONS

International Preliminary Report on Patentability (Chapter 1) date of mailing May 30, 2014 in PCT/US2012/062508.

* cited by examiner

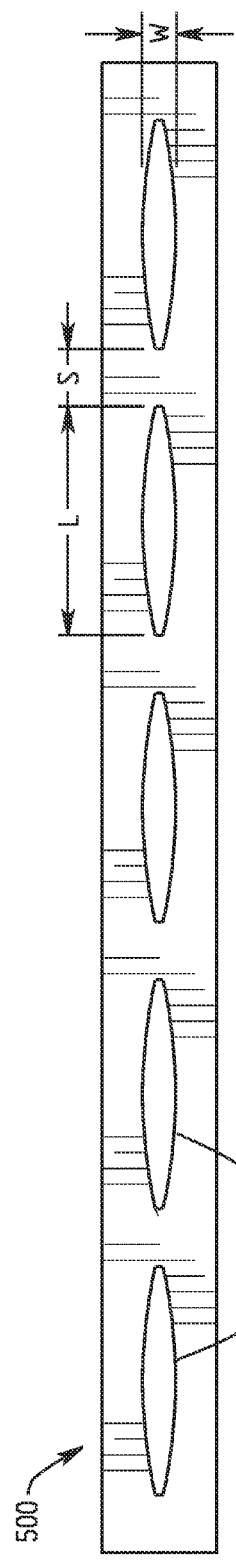
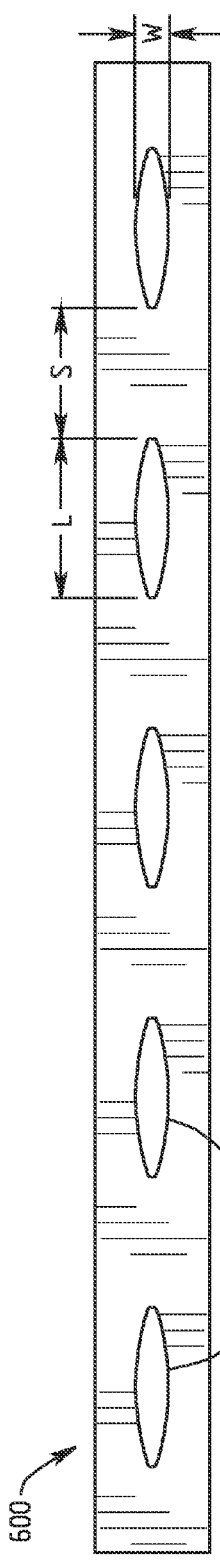
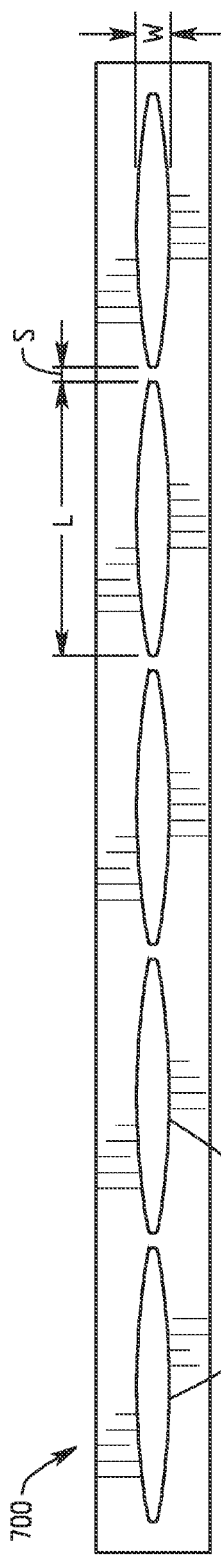
Fig. 5
Fig. 6
Fig. 7

METHODS AND SYSTEMS INVOLVING MANUFACTURING SHEET PRODUCTS BY TESTING PERFORATIONS

CLAIM FOR PRIORITY

This non-provisional application is based upon U.S. Provisional Application No. 61/560,458, filed Nov. 16, 2011. The priority of U.S. Provisional Application No. 61/560,458 is hereby claimed and the disclosure thereof is incorporated in its entirety into this non-provisional application by reference thereto.

BACKGROUND OF THE INVENTION

The subject matter disclosed herein relates to methods and systems for fabricating sheet products, and particularly to forming rolls of sheet products.

Many sheet products are fabricated into rolls of sheet products. The sheet products may include lines of perforations that are formed by passing the sheet product through a perforation apparatus that cuts perforations in the sheet product. Once the perforations are formed, the sheet product may be wound into a roll of sheet products. The perforations allow a user to easily separate portions of the sheet product from a roll.

BRIEF DESCRIPTION OF THE INVENTION

According to one aspect of the invention, a method includes receiving a first image of a first line of perforations in a sheet product, processing the first image to determine whether the first line of perforations are within specifications, and outputting an indication to an operator indicative that the first line of perforations are not within specifications responsive to determining that the first line of perforations are not within specifications.

According to another aspect of the invention, a system includes a first camera, and a processor operative to receive a first image of a first line of perforations formed by a perforating arrangement in a sheet product from the first camera, process first image to determine whether the first line of perforations are within specifications, output an indication to an operator indicative that the first line of perforations are not within specifications responsive to determining that the first line of perforations are not within specifications.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 5-7 illustrate examples of images of lines of perforation in the sheet product.

The detailed description explains embodiments of the invention, together with advantages and features, by way of example with reference to the drawings.

DETAILED DESCRIPTION OF THE INVENTION

Sheet products are often fabricated into rolls of sheet products. Prior to forming the rolls, the sheet product may be processed to fabricate lines of perforations that are usually arranged parallel to the rotational axis of the rolls. The lines of perforations allow a user to easily separate portions of the sheet material from the roll. The lines of perforations are often formed by passing the sheet product through a perforating mechanism that forms the perforations. The distance or interference between the anvil and knife affects quality of the cut. In operation, an operator typically inspects the line of perforations to determine if the line of perforations is within desired specifications. The operator may then adjust the perforating mechanism if desired to form the proper perforations. Once the perforations have been formed, the sheet product could be wound to form a roll having a desired length.

The term "sheet products" as used herein is inclusive of natural and/or synthetic cloth or paper sheets. Sheet products may include both woven and non-woven articles. There are a wide variety of nonwoven processes and they can be either wetlaid or drylaid. Some examples include hydroentangled (sometimes called spunlace), DRC (double re-creped), airlaid, spunbond, carded, paper towel, and meltblown sheet products. Further, sheet products may contain fibrous cellulosic materials that may be derived from natural sources, such as wood pulp fibers, as well as other fibrous material characterized by having hydroxyl groups attached to the polymer backbone. These include glass fibers and synthetic fibers modified with hydroxyl groups. Examples of sheet products include, but are not limited to, wipers, napkins, tissues, towels or other fibrous, film, polymer, or filamentary products.

In general sheet products are thin in comparison to their length and width and exhibit a relatively flat planar configuration and are flexible to permit folding, rolling, stacking, and the like. The sheet product may have perforations extending in lines across its width to separate individual sheets and facilitate separation or tearing of individual sheets from a roll or folded arrangement at discrete intervals. Individual sheets may be sized as desired to accommodate the many uses of the sheet products. For example, a row of perforations may be formed every 13 inches (33 cm), or other defined interval, to define a universally sized sheet.

Figure 1:
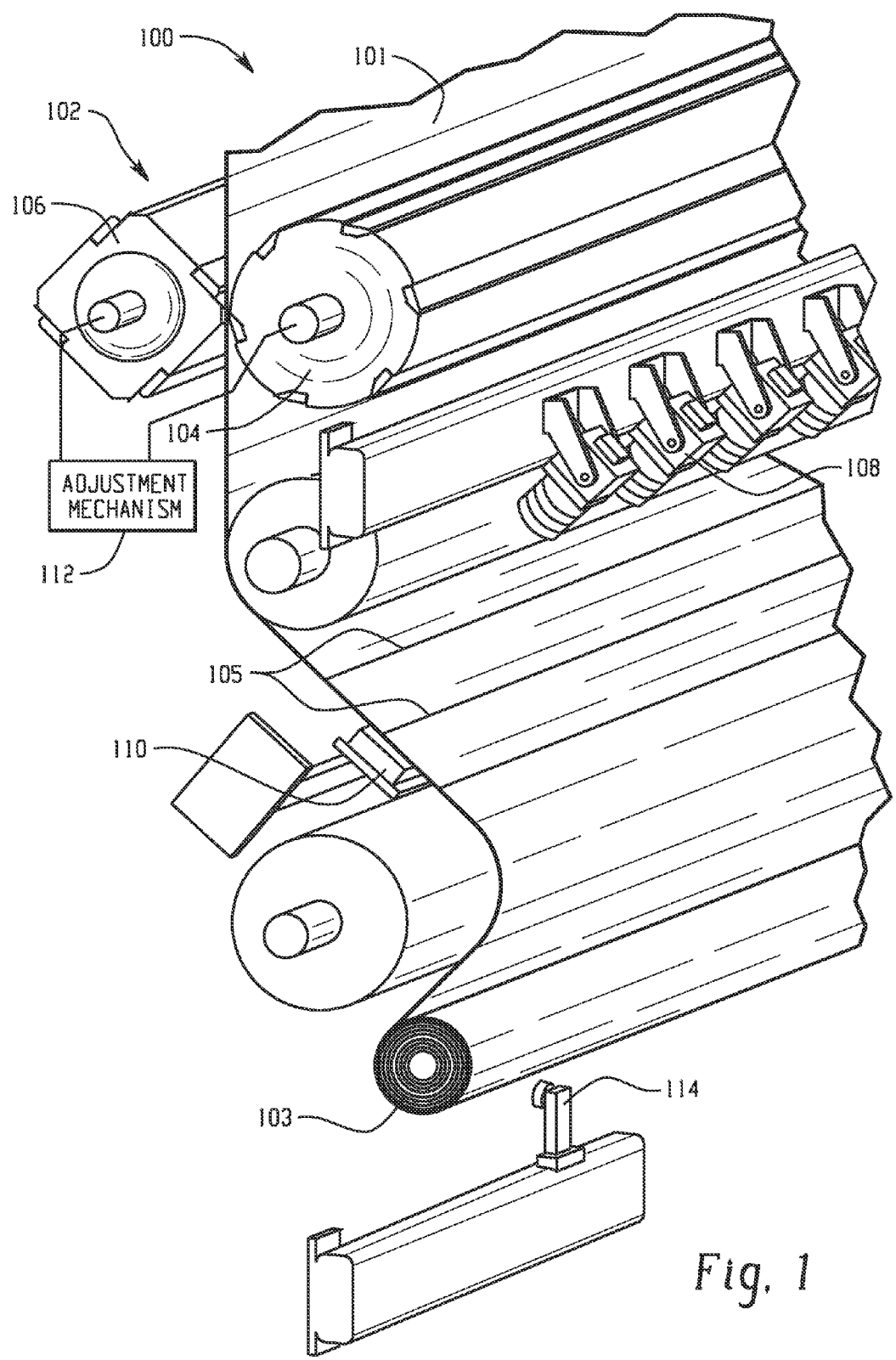
FIG. 1 illustrates an exemplary portion of a system for fabricating perforations in a sheet product and rolling the sheet product.

FIG. 1 illustrates an exemplary portion of a system 100 for fabricating perforations in a sheet product and rolling the sheet product. Alternate embodiments may include similar systems that may be, for example, orientated horizontally or vertically, but operate in a similar manner.

In this regard, the system 100 includes a perforating arrangement 102 that includes an anvil roller 104 and a perforations roller 106. The perforations roller 106 includes a perforating member that is operative to form a line of perforations 105 in the sheet product 101 as the sheet product 101 passes between the perforations roller 106 and the anvil roller 104. Once the perforations 105 are formed in the sheet product 101, the sheet product 101 is wound into a roll 103. The quality of the cut is determined by the position of the perforations roller 106 relative to the anvil roller 104. The sheet product 101 passes through an interference defined by the perforations roller 106 and the anvil roller 104. The interference may be adjusted with a roller position adjustment mechanism 112 such that a smaller distance between the perforations roller 106 and the anvil roller 104 results in greater interference between the perforations roller 106 and the anvil roller 104, while a larger distance between the perforations roller 106 and the anvil roller 104 results in less interference between the perforations roller 106 and the anvil roller 104. When properly adjusted, the interference between the perforations roller 106 and the anvil roller 104 exerts a proper amount of pressure to sever the fibers in the sheet product 101 resulting in perforations 105 having desired dimensions. The adjustment mechanism 112 may include, for example, motors or servos mechanically linked to the perforating arrangement 102 to adjust the position of the anvil roller 104 relative to the perforations roller 106. In the illustrated embodiment, the system 100 includes an arrangement of one or more visual devices 108, such as, for example, cameras or other similar devices, that may be used to visually determine whether the desired perforations 105 have been formed in the sheet product 101. The system 100 may then properly adjust the position of the perforations roller 106 relative to the anvil roller 104 to control the quality of the cut.

The system 100 may include one or more backlights 110 that are arranged in opposition to the visual device 108 such that the sheet product 101 passes between the visual device 108 and the backlights 110. The backlights 110 are operative to illuminate the line of perforations 105 by passing light through the perforations 105, which improves the images output by the visual device 108.

Figures 2, 3:
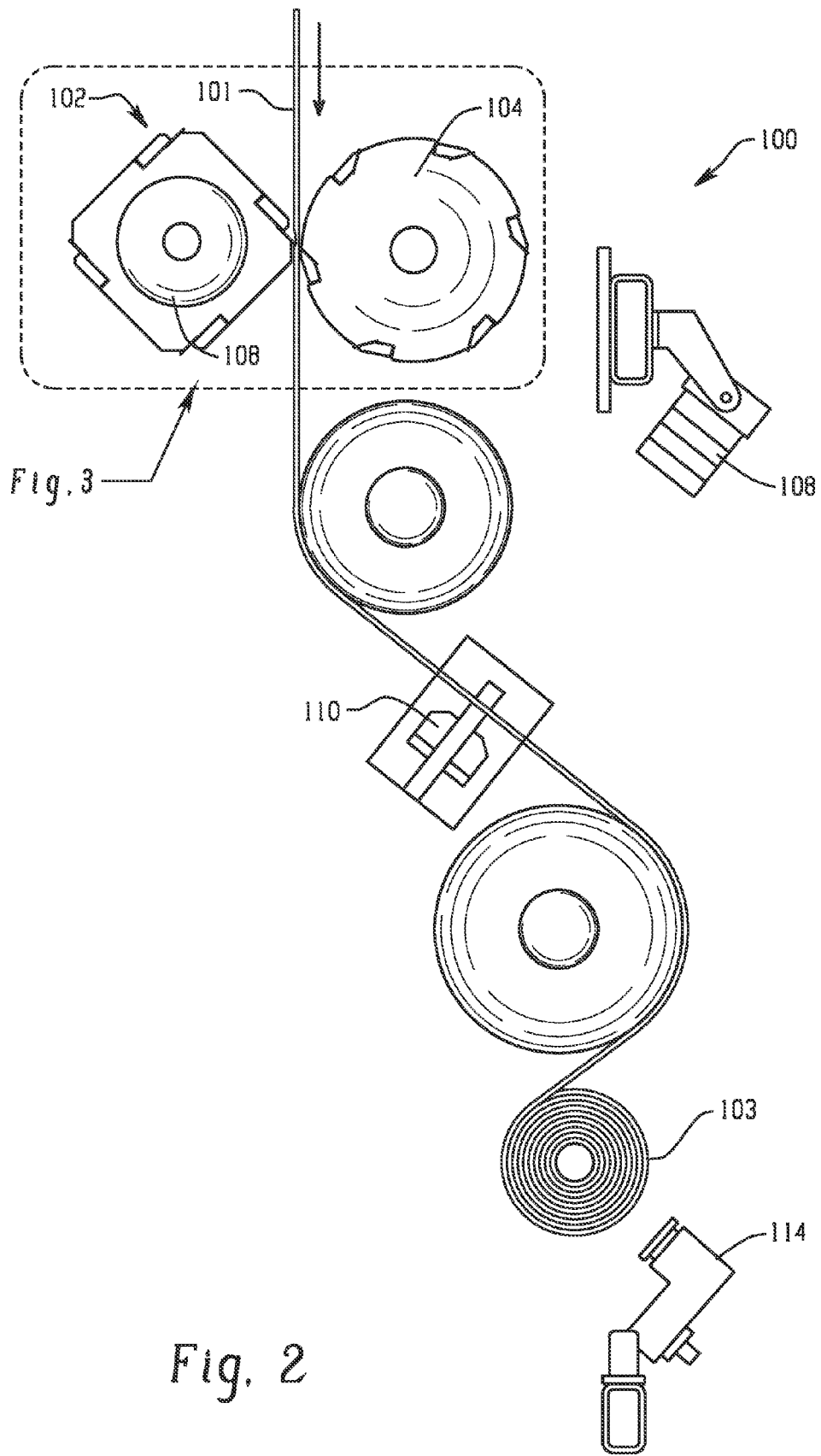
FIG. 2 illustrates a side view of a portion of the system.
FIG. 3 illustrates a detailed view of the region 3 of FIG. 2.
Figure 3:
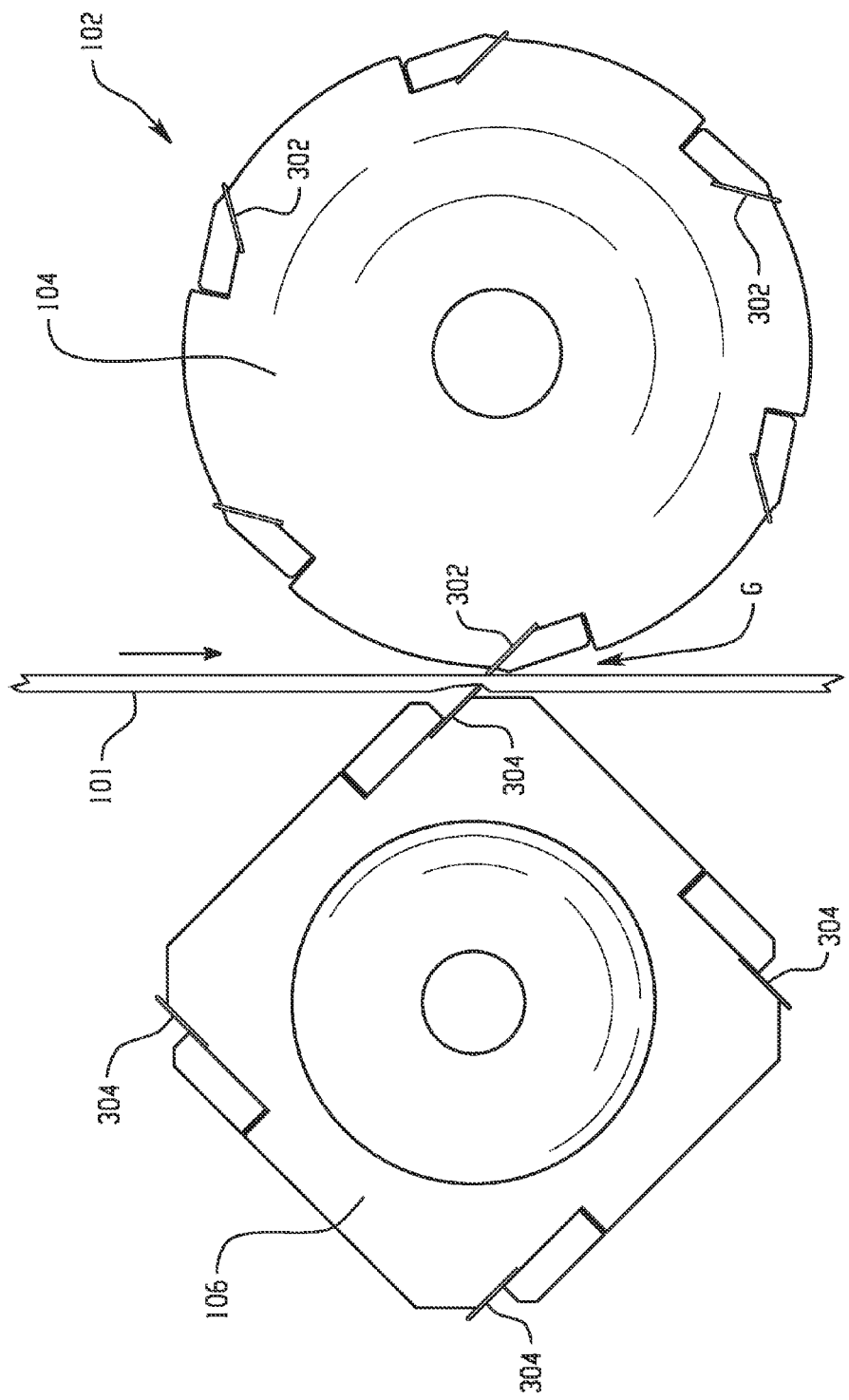

FIG. 2 illustrates a side view of a portion of the system 100 that includes the perforating arrangement 102, the visual devices 108, backlights 110, and a roll 103 that is formed following the formation of the perforations 105 (FIG. 1) in the sheet product 101 using a suitable roll forming apparatus. In the illustrated embodiment, the system 100 may include a second visual device(s) 114 that may be used to determine a diameter (d) of the roll 103. For example, the second visual device 114 may be used to determine whether the roll 103 is within a desired diameter specification. If not, the system 100 will signal an output to downstream equipment to automatically or manually remove the roll 103 from production if desired.

FIG. 3 illustrates a detailed view of the region 3 of FIG. 2. In this regard, perforations roller 106 includes a knife portion 304. The anvil roller 104 includes an anvil portion 302. The anvil roller 104 and the perforations roller 106 of the perforating arrangement 102 define an interference having a width G. The width of the interference affects the amount of interference between the perforations roller 106 and the anvil roller 104.

Figure 4:
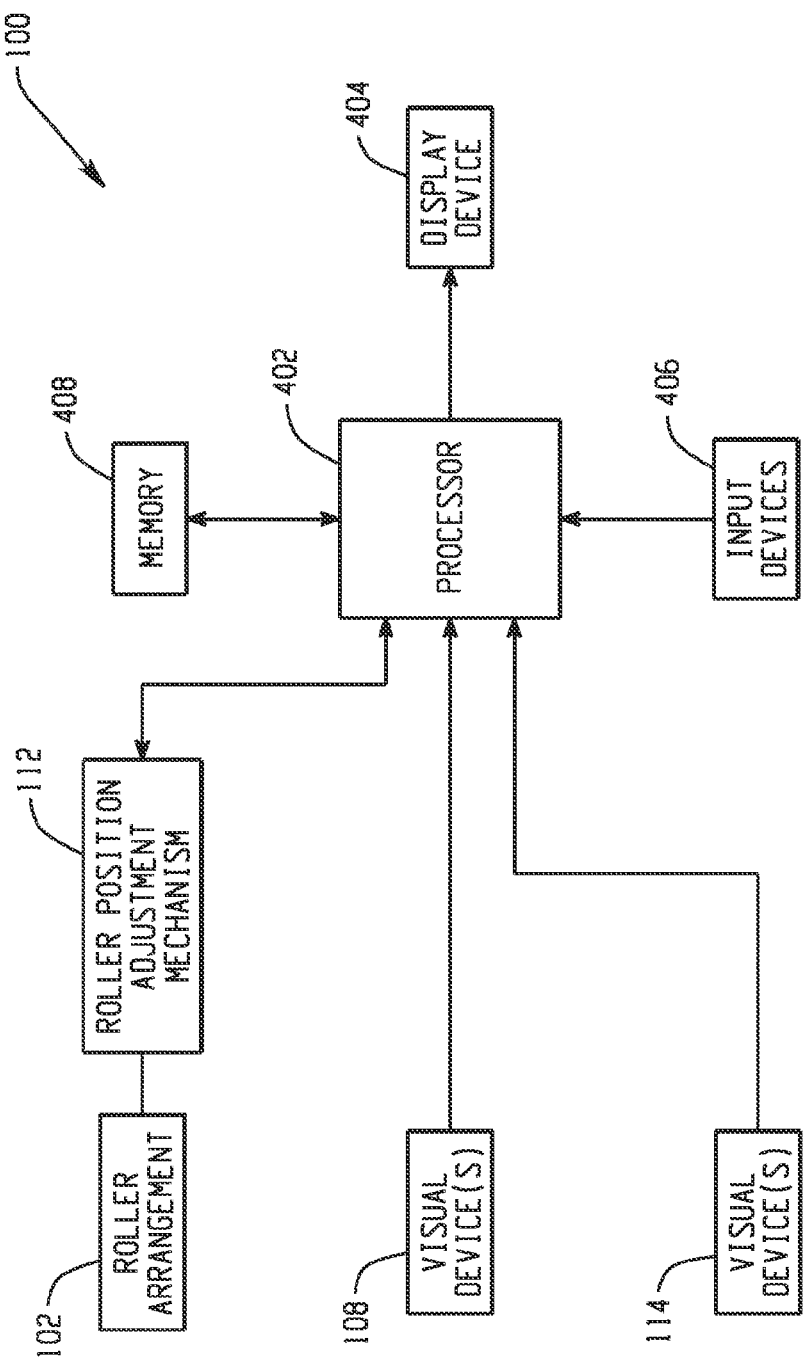
FIG. 4 illustrates a block diagram of the system.

FIG. 4 illustrates a block diagram of the system 100. Referring to FIG. 4 with periodic reference to FIG. 1, the system 100 includes a processor 402 that is communicatively connected to a display device 404, a memory device 408, and input devices 406. The visual device 108 output images of the lines of perforations 105 in the sheet product 101 as the sheet product 101 exits the perforating arrangement 102. The images from the visual device 108 are received by the processor 402. The processor 402 may use a stored image of a line of perforations 105 that has a desired shape and profile, and adjust the relative position of the rollers 104 and 106 in the perforating arrangement 102 using a roller position adjustment mechanism 112 so that subsequent perforations 105 substantially match the desired shape and profile of the perforations 105 depicted in the stored image. The adjustment mechanism 112 may include, for example, one or more motors that may be controlled by the processor 402 to adjust an interference between the anvil roller 104 and the perforations roller 106. The processor 402 may use logic that determines whether the lines of perforations 105 are, for example, cut with too large of an interference. If the perforations 105 are cut with too large of an interference, the processor 402 may reduce the interference G (of FIG. 3) using the adjustment mechanism 112. Alternatively, if the lines of perforations 105 are cut with too small of an interference, the processor 402 may use the adjustment mechanism 112 to increase the interference G.

FIGS. 5-7 illustrate examples of base images 500, 600, and 700 of lines of perforation in the sheet product 101 (FIG. 1). The base images 500, 600, and 700 represent examples of processed images that may be used by the processor 402 (of FIG. 4) to determine whether the lines of perforations 105 are within desired specifications. In this regard FIG. 5, FIG. 6, and FIG. 7 illustrate exemplary base images 500, 600, and 700 of lines of perforations of a portion of the sheet product 101. The perforations are shown as shaded regions 503, 603, and 703. For illustrative purposes, FIG. 5, FIG. 6, and FIG. 7 illustrate lines of perforations that are within specifications. For example, the width (W), length (L), and spacing (S) distances and shapes of the shaded regions 503, 603, and 703 may be measured to determine whether the lines of perforations (partially defined by the shaded regions 503, 603, and 703) are within specifications. The base images 500, 600, and 700 (or a similar image) may be used as the base image described above. If the width (W), length (L), and spacing (S) distances and shapes of the shaded regions 503, 603, and 703 vary from the base image used by the processor 402, this indicates that the perforations have been cut with a wrong interference G. As discussed above, the processor 402 may use a comparison of the base image (e.g., images 500, 600, and 700) with the size and shape of the perforations in received images to determine whether the length, width, and spacing of the perforations in the received images are close (i.e., within specifications or thresholds) to the base image.

Figure 8A:
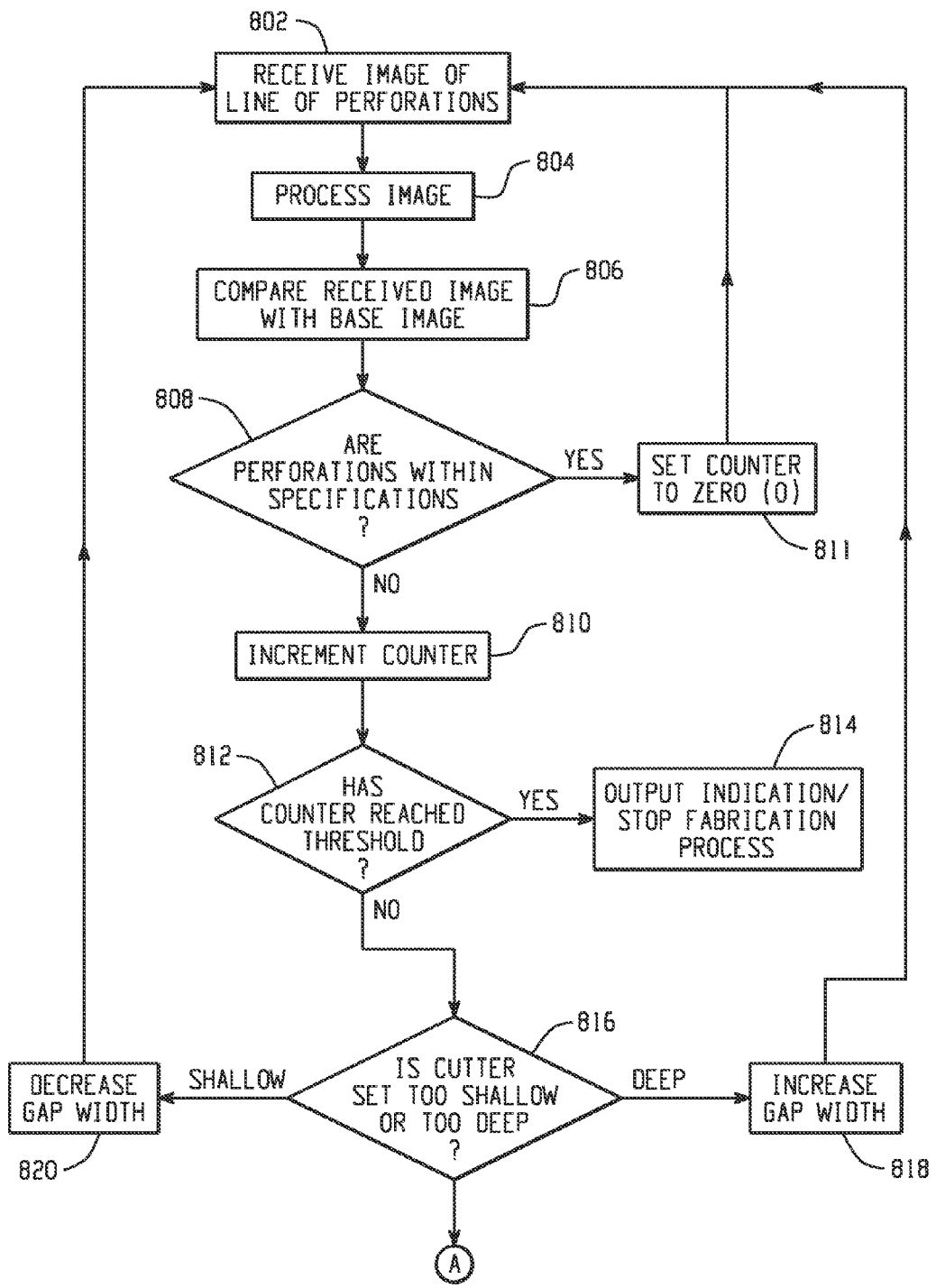
FIGS. 8A and 8B illustrate a block diagram of an exemplary method that may be performed by the system of FIG. 1.
Figure 8B:
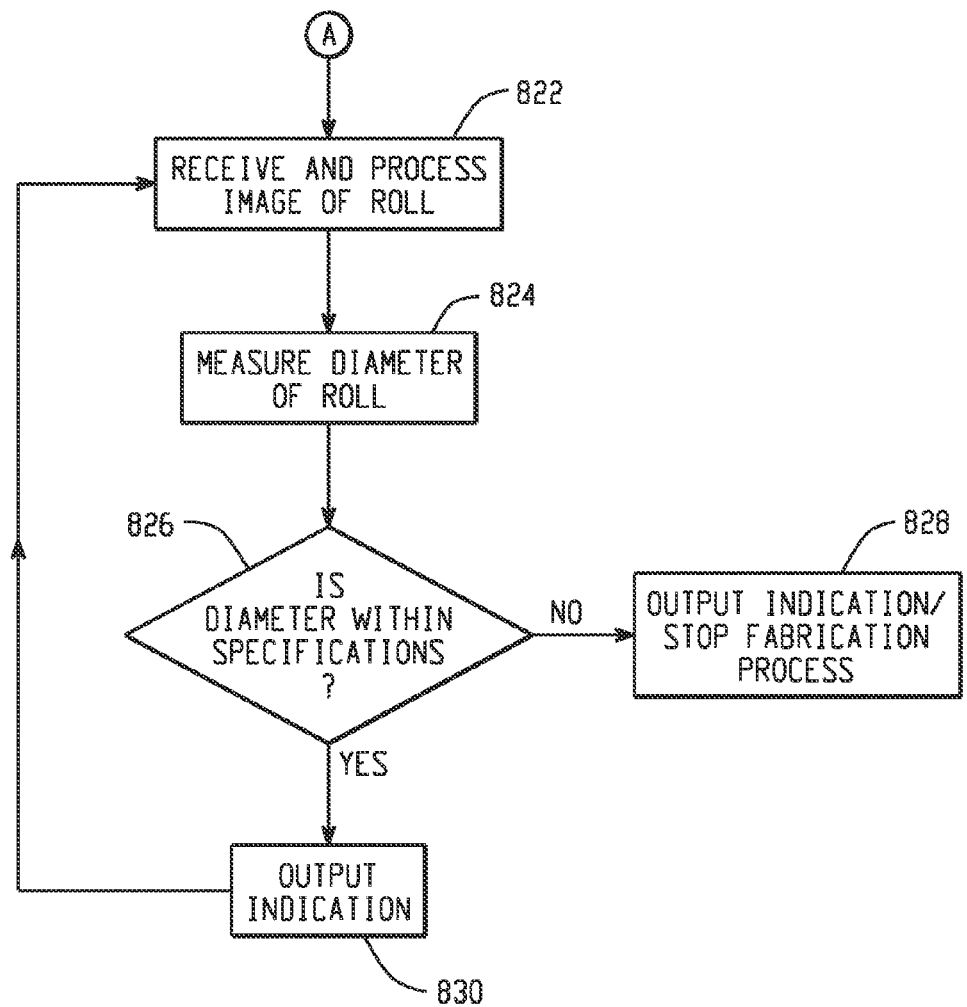

FIGS. 8A and 8B illustrate a block diagram of an exemplary method that may be performed by the system 100 (FIG. 1) described above. In this regard, in block 802, the processor 402 (of FIG. 4) receives an image of a line of perforations 105 (of FIG. 1). In block 804, the processor 402 processes the image. The image may be processed to for example, account for variations in the positions of the perforations 105 relative to the frame of the image. The processing may include, for example, other visual processing methods such as processing a video image to identify a frame of the video image that includes a line of perforations 105. The frame of the video image may be used as the received image. The processing may also include, inverting the grayscale or color scale of the pixels of the image, or other suitable imaging processing methods. In block 806, the processor 402 compares the received image with a base image that may be stored in the memory device 408 (of FIG. 4). The base image includes an image of a line of perforations 105 having a desired depth, shape, and profile. The processor 402 determines whether the perforations 105 in the received image are within a threshold or specification range (i.e., whether the received image is sufficiently similar to the base image) in block 808. If the perforations 105 are not within specifications, the processor 402 increments a counter (that may be stored on the processor 402) in block 810. If the perforations 105 are within specifications, the processor 402 resets the counter (i.e., sets the counter to zero (0) in block 811. In block 812, the processor 402 determines whether the counter has reached a threshold count and outputs an indication that the counter has reached the threshold count in block 814. The indication may be output via the display device 404 (FIG. 4) that may include, for example, a display screen or other type of visual indicator device such as an indicator light, or in some embodiments an audible indication may be output to an operator. The fabrication process may be automatically or manually stopped or delayed in block 814 allowing an operator to remove the sheet product 101 with the out of specification perforations 105 from processing or to identify and correct the problem causing the out of specification perforations 105. If the counter has not reached the threshold, the processor 402 determines whether the perforations 105 indicate that the cutters are set too deep or too shallow in block 816. If the perforations 105 are too deep, the processor 402 adjusts the interference G (of FIG. 3) to increase the width of the interference G in block 818. If the perforations 105 are too shallow, in block 820, the processor 402 decreases the width of the interference G. In block 822 (of FIG. 8B), the processor 402 receives and processes an image of the roll 103 (of FIG. 2) from the second visual device 114. The processor 402 may identify the tangential edges of the roll 103 and calculate the diameter of the roll 103 in block 824. In block 826, the processor 402 determines whether the measured diameter is within a specification threshold for the diameter of the roll 103. If the measured diameter is not within the specification threshold, an indication may be output in block 828. If desired, the fabrication process may be stopped or delayed to allow the roll 103 to be removed from further fabrication. In block 830, an indication that the diameter of the roll 103 is within specifications may be output to an operator.

Figure 9:
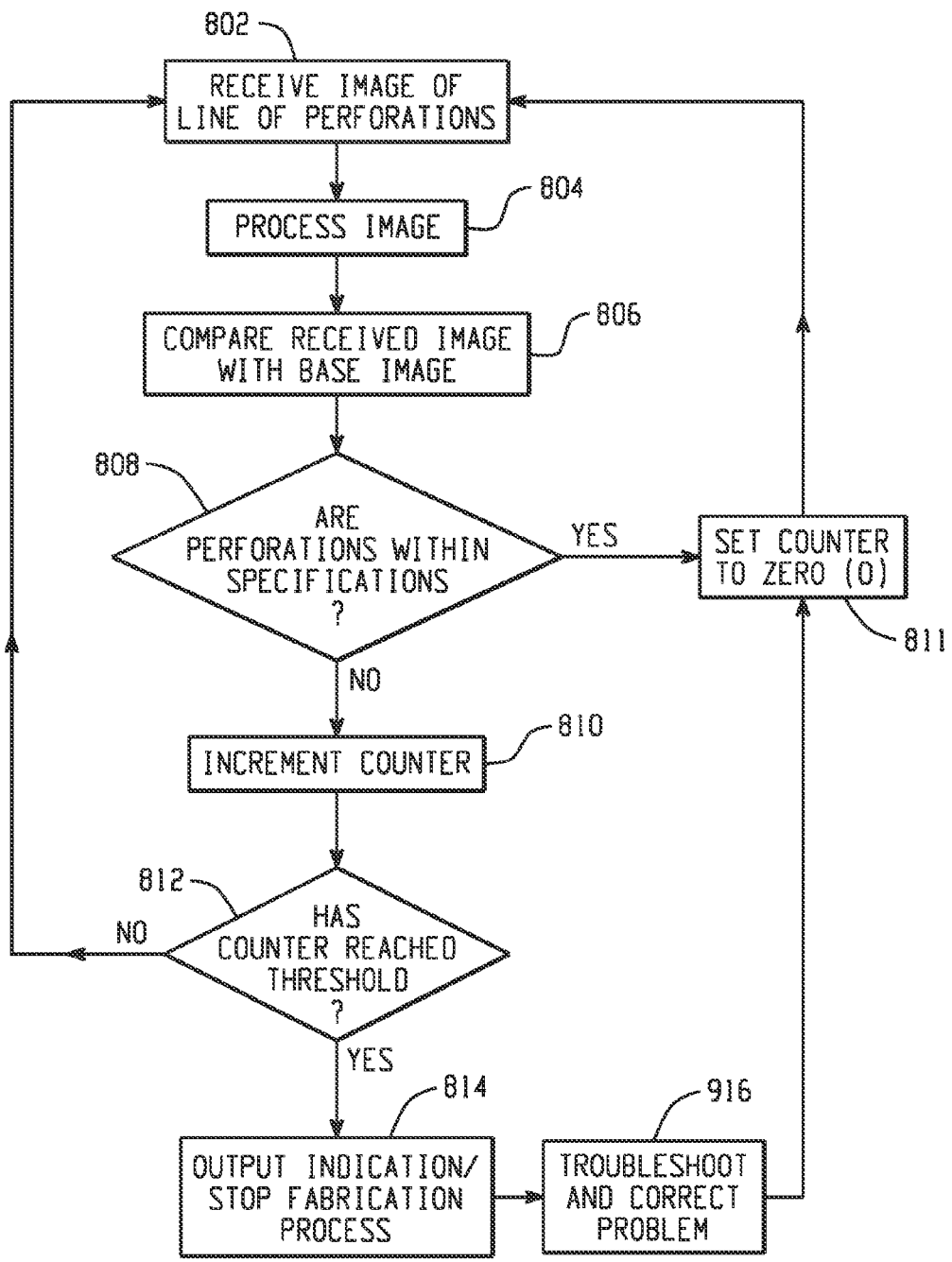
FIG. 9 illustrates a block diagram of an alternate exemplary method that may be performed by the system of FIG. 1.

In an alternate exemplary embodiment, the system 100 (of FIG. 1) may operate in an alternate exemplary method similar to the method described above in FIG. 8A. Referring to FIG. 9, in block 814 an indication is output to an operator that the perforations 105 are out of specifications. The indication may include, for example, a visual indicator on the display device 404 (of FIG. 4), a visual indicator such as, for example a light, and/or an audible indicator. The operator may stop the fabrication process manually, or the system 100 may be set to stop the fabrication process upon determining that the counter has reached the threshold (in block 812). In block 916, the operator may troubleshoot to identify the cause of the out of specification perforations 105 and may correct the problem. Once the problem is corrected, the counter may be set to zero in block 811 and the fabrication process may begin again in block 802.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
  receiving a first image of a first line of perforations in a sheet product;
  processing the first image to determine whether the first line of perforations are within specifications, wherein the specifications include at least one of a width of one or more perforations, a length of one or more perforations and a spacing of one or more perforations in the first line of perforations;
  outputting an indication to an operator indicative that the first line of perforations are not within specifications responsive to determining that the first line of perforations are not within specifications;
  adjusting a perforating arrangement by:
    changing, in response to the determination, an amount of a distance between an anvil roller and a perforations roller, wherein the sheet product is disposed between an overlapping portion of the anvil roller and the perforations roller which are disposed on opposing sides of the sheet product; and
    advancing the sheet product such that a subsequently formed line of perforations in the sheet product is within specifications responsive to determining that the first line of perforations is not within specifications; and
  forming the sheet product into a roll.

2. The method of claim 1, wherein the processing the first image includes comparing the first image with a base image to determine whether the first line of perforations are within specifications.

3. The method of claim 1, wherein the first line of perforations are formed by the perforating arrangement.

4. The method of claim 1, wherein the method further comprises:
  receiving an image of the roll;
  measuring a diameter of the roll;
  determining whether the diameter of the roll is within a diameter specification; and
  outputting an indication that the diameter of the roll is not within the diameter specification responsive to determining that the diameter of the roll is not within the diameter specification.

5. The method of claim 1, wherein the method further comprises: incrementing a counter responsive to determining that the first line of perforations is not within specifications.

6. The method of claim 5, wherein the method further comprises:
  determining whether the counter has reached a threshold value responsive to incrementing the counter; and
  outputting an indication that the counter has reached the threshold value responsive to determining that the counter has reached the threshold value.

7. The method of claim 1, wherein the method further comprises setting the counter to zero responsive to determining that the first line of perforations is within specifications.

8. The method of claim 1, wherein the comparing the first image with the base image comprises comparing a size and shape of the first line of perforations of the first image with a size and shape of the line of perforations of the base image.

9. The method of claim 1, wherein the method further comprises:
  receiving a video image; and
  processing the video image to define the first image, wherein the first image includes a frame of the video image.

10. A system comprises:
  a first camera; and
  a processor operative to:
    receive a first image of a first line of perforations formed by a perforating arrangement in a sheet product from the first camera;
    process first image to determine whether the first line of perforations are within specifications;
    output an indication to an operator indicative that the first line of perforations are not within specifications responsive to determining that the first line of perforations are not within specifications, wherein the specifications include at least one of a width of one or more perforations, a length of one or more perforations and a spacing of perforations in the first line of perforations; and adjust a perforating arrangement by:

changing, in response to the determination, an amount of a distance between an anvil roller and a perforations roller, wherein the sheet product is disposed between an overlapping portion of the anvil roller and the perforations roller which are disposed on opposing sides of the sheet product; and advancing the sheet product such that a subsequently formed line of perforations in the sheet product is within specifications responsive to determining that the first line of perforations is not within specifications; and forming the sheet product into a roll.

11. The system of claim 10, wherein the processing the first image includes comparing the first image with a base image to determine whether the first line of perforations are within specifications.

12. The system of claim 10, wherein the system further comprises a visual indicator communicatively connected to the processor.

13. The system of claim 10, wherein the system further comprises:
a roll forming apparatus; and
a second camera.

14. The system of claim 13, wherein the processor is further operative to receive an image of the roll from the second camera, measure a diameter of the roll, determine whether the diameter of the roll is within a diameter specification, and output an indication that the diameter of the roll is not within the diameter specification responsive to determining that the diameter of the roll is not within the diameter specification.

15. The system of claim 10, wherein the processor is further operative to increment a counter responsive to determining that the first line of perforations is not within specifications.

16. The system of claim 10, wherein the processor is further operative to set the counter to zero responsive to determining that the first line of perforations is within specifications.

17. The system of claim 16, wherein the processor is further operative to determine whether the counter has reached a threshold value responsive to incrementing the counter, and output an indication that the counter has reached the threshold responsive to determining that the counter has reached the threshold.

18. The system of claim 10, wherein the comparing the first image with the base image comprises comparing a size and shape of the first line of perforations of the first image with a size and shape of the line of perforations of the base image.

19. The system of claim 10, wherein the system further includes a backlight arrangement operative to illuminate the first line of perforations.

* * * * *